US011668307B2

(12) United States Patent
Han et al.

(10) Patent No.: US 11,668,307 B2
(45) Date of Patent: Jun. 6, 2023

(54) OIL TUBING INSTALLATION ASSEMBLY AND SCROLL COMPRESSOR

(71) Applicant: Danfoss (Tianjin) Ltd., Tianjin (CN)

(72) Inventors: Lixin Han, Tianjin (CN); Xiaodong Wang, Tianjin (CN); Qing Zhang, Wuqing (CN); Jing Zhao, Tianjin (CN); Wenhu Yao, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 0 days.

(21) Appl. No.: 17/702,225

(22) Filed: Mar. 23, 2022

(65) Prior Publication Data

US 2022/0325713 A1   Oct. 13, 2022

(30) Foreign Application Priority Data

Mar. 31, 2021   (CN) .......................... 202120662525.7

(51) Int. Cl.
*F03C 2/00* (2006.01)
*F03C 4/00* (2006.01)
(Continued)

(52) U.S. Cl.
CPC ........ *F04C 29/028* (2013.01); *F04C 18/0215* (2013.01); *F04C 23/008* (2013.01);
(Continued)

(58) Field of Classification Search
CPC .. F04C 18/0215; F04C 23/008; F04C 29/023; F04C 29/026; F04C 29/028;
(Continued)

(56) References Cited

U.S. PATENT DOCUMENTS

| 5,762,299 A   * | 6/1998 | Motsch ..................... F16L 3/04 |
| | | 248/71 |
| 2010/0098570 A1* | 4/2010 | Bodart .................. F04C 29/021 |
| | | 418/87 |

(Continued)

FOREIGN PATENT DOCUMENTS

| CN | 107740767 A | 2/2018 |
| CN | 209025840 U | 6/2019 |

(Continued)

OTHER PUBLICATIONS

KR20060027306A—Kim et al.—Fixing Structure of Outside Water Pipe—Mar. 27, 2006—machine English Translation (Year: 2006).*

(Continued)

*Primary Examiner* — Theresa Trieu
(74) *Attorney, Agent, or Firm* — McCormick, Paulding & Huber PLLC

(57) ABSTRACT

The disclosure provides an oil tubing installation assembly and a scroll compressor adopting the same. The oil tubing installation assembly is adapted to be installed into a shell in a vertical direction and includes: a housing on which a vertical oil tubing installation surface and an oil hole located in the oil tubing installation surface are provided; a clip adapted to be installed on the oil tubing installation surface and into the shell along with the housing; and an oil tubing assembly adapted to be installed into the clip in a vertical direction after the housing and the clip have been installed into the shell. The oil tubing assembly includes an oil tubing body and a cuboid-shaped installation block. A through hole is provided in the installation block and the through hole is configured to have a first orifice on the front surface of the installation block and a second orifice on the rear surface of the installation block. The upper end of the oil tubing body is connected to the first orifice. The second orifice is aligned with and fitted to the oil hole after the installation block is installed in place in the clip. In this way, the long oil tubing can be easily installed manually in place even after the housing has been pressed into the shell.

13 Claims, 12 Drawing Sheets

(51) Int. Cl.
   *F04C 18/00*   (2006.01)
   *F04C 2/00*    (2006.01)
   *F04C 29/02*   (2006.01)
   *F16L 7/00*    (2006.01)
   *F04C 18/02*   (2006.01)
   *F04C 23/00*   (2006.01)

(52) U.S. Cl.
   CPC ............ *F16L 7/00* (2013.01); *F04C 2240/30* (2013.01); *F04C 2240/806* (2013.01)

(58) Field of Classification Search
   CPC ... F04C 2240/30; F04C 2240/806; F16L 7/00; F16L 3/04
   See application file for complete search history.

(56) References Cited

U.S. PATENT DOCUMENTS

| | | | | |
|---|---|---|---|---|
| 2017/0167489 | A1* | 6/2017 | Lynch | F04C 18/0215 |
| 2018/0066700 | A1* | 3/2018 | Kozu | F04C 18/0215 |
| 2021/0095666 | A1* | 4/2021 | Ma | F04C 18/0215 |

FOREIGN PATENT DOCUMENTS

| | | | |
|---|---|---|---|
| CN | 110360103 A | 10/2019 | |
| CN | 111033045 A | 4/2020 | |
| CN | 210715090 U | 6/2020 | |
| CN | 112283103 A | 1/2021 | |
| CN | 212563648 U | 2/2021 | |
| CN | 112460027 A | 3/2021 | |
| CN | 112585357 A | 3/2021 | |
| EP | 2 527 654 A1 | 11/2012 | |
| EP | 3 290 711 A1 | 3/2018 | |
| JP | 10047269 A | 2/1998 | |
| JP | 2006097517 A | 4/2006 | |
| JP | 2006291861 A | 10/2006 | |
| KR | 20060027306 A * | 3/2006 | ............... F16L 3/04 |
| WO | 2017/106030 A1 | 6/2017 | |

OTHER PUBLICATIONS

IPCM000206852D—Disclosed Anonymously—Compressor with Integrated Oil collection—May 10, 2011—(Year: 2011).*
Extended European Search Report for European Patent Application No. 22160597.5 dated Aug. 8, 2022.
First Examination Report corresponding to Indian Patent Application No. 202214014020 dated Oct. 11, 2022.

* cited by examiner

Prior Art

Prior Art

Prior Art

Prior Art

OIL TUBING INSTALLATION ASSEMBLY AND SCROLL COMPRESSOR

CROSS-REFERENCE TO RELATED APPLICATION

This application claims foreign priority benefits under 35 U.S.C. § 119 to Chinese Patent Application No. 202120662525.7 filed on Mar. 31, 2021, the content of which is hereby incorporated by reference in its entirety.

BACKGROUND OF THE INVENTION

Technical Field

Embodiments of the disclosure relate to an oil tubing installation assembly and a scroll compressor.

Background

In most of the current compressors, the length of the oil tubing installed on the housing is short, or when the oil tubing is installed to the housing from the inside of the housing, the existing oil tubing with short length is difficult to meet the functional requirements of both maintaining a low oil circulation rate and drawing excess oil away from the housing. Therefore, it is desirable to use an oil tubing with longer length in the compressor. However, it is difficult for the existing assembling tools to meet the assembling requirements of the new type compressors with a longer oil tubing.

FIG. 1A is a perspective view of a state prior to assembling a housing with an oil tubing into a mid-shell of a compressor in the prior art, FIG. 1B is a partially cutaway side view of the state shown in FIG. 1A, FIG. 2A is a perspective view of a state after assembling a housing with an oil tubing into a mid-shell of a compressor in the prior art, and FIG. 2B is a partially cutaway side view of the state shown in FIG. 2A.

Specifically, on one hand, as shown in FIGS. 1A to 2B, in order to assemble the housing 10 with the oil tubing 30 into the mid-shell 20 of the compressor 1, it is necessary to use an assembling tool (not shown in the drawings) to raise the housing 10 to a certain height (H) so that the lower end of the oil tubing 30 can be placed into the mid-shell 20, and then the housing 10 with the oil tubing 30 can be assembled into the mid-shell 20 in the vertically downward direction R. In this case, in order to assemble the housing 10 with a longer oil tubing into the mid-shell 20, it is necessary to increase the stroke of the assembling tool to increase the height to which the housing 10 is raised. However, in the prior art, due to the limitation of the structural size of the assembling tool itself, the height to which the housing 10 is raised is limited.

On the other hand, if the oil tubing 30 is assembled separately after the housing 10 has been installed into the mid-shell 20, it is difficult to assemble the oil tubing 30 to the housing 10 in the mid-shell 20 since the residual space (D) between the housing 10 and the mid-shell 20 is too small.

SUMMARY

Technical Problem

The disclosure is made in order to solve the problem that the oil tubing is difficult to be installed into the mid-shell of the compressor together with the housing due to its too long length, and other potential technical problems.

Technical Solutions

According to one aspect of the present disclosure, there is provided an oil tubing installation assembly adapted to be installed into a shell in a vertical direction. The oil tubing installation assembly comprises: a housing on which a vertical oil tubing installation surface and an oil hole located on the oil tubing installation surface are provided; a clip adapted to be installed on the oil tubing installation surface and then installed into the shell along with the housing; and an oil tubing assembly adapted to be installed into the clip in a vertical direction after the housing and the clip have been installed into the shell. The oil tubing assembly comprises an oil tubing body and an overall cuboid-shaped installation block. A through hole is provided in the installation block. The through hole is configured to have a first orifice on the front surface of the installation block and a second orifice on the rear surface of the installation block. The upper end of the oil tubing body is connected to the first orifice. The second orifice is aligned with and fitted to the oil hole after the installation block is installed in place in the clip.

Specifically, the clip is configured to have a horizontal bottom plate and first elastic tongues extending upward from the front edge of the bottom plate. The first elastic tongues are configured to be in contact with the front surface of the installation block and apply pressure to the front surface of the installation block, so that the rear surface of the installation block is abutted on the oil tubing installation surface and the second orifice is tightly fitted to the oil hole after the installation block is installed in place in the clip.

Preferably, the upper ends of the first elastic tongues are bent to the outside and able to abut against the inner wall of the shell.

Preferably, grooves are provided on the front surface of the installation block. The first elastic tongues can be embedded into the corresponding grooves after the installation block is installed in place in the clip.

Optionally, the clip is configured to have second tongues extending upward respectively from the left and right edges of the bottom plate. The second tongues are configured to be respectively in contact with and apply pressure to the left and right sides of the installation block to inhibit the movement of the installation block in the left-right direction.

Preferably, the upper ends of the second tongues are bent to the outside.

Specifically, threaded holes are provided on the oil tubing installation surface. The clip is configured to also have third tongues. Each of the third tongues respectively extends to the left and right sides from the vertical edge of the two vertical edges of the corresponding one of the second tongues which is closer to the oil tubing installation surface. Through holes are provided in the third tongues. The through holes in the third tongues are aligned with the threaded holes on the oil tubing installation surface after the clip is installed in place on the oil tubing installation surface so as to fasten the clip to the housing with screws going through the through holes in the third tongues and the threaded holes on the oil tubing installation surface.

Specifically, the housing is configured to have an outer peripheral surface, the oil tubing installation surface is located on the outer peripheral surface and is radially inwardly offset relative to the outer peripheral surface, so as to form a first stepped surface at the junction of the outer peripheral surface and the oil tubing installation surface. A lower bottom surface is provided below the oil tubing installation surface. The lower bottom surface is adjacent to and perpendicular to the oil tubing installation surface. The rear surface of the installation block comprises an upper rear surface and a lower rear surface. The second orifice is located in the lower rear surface. A second stepped surface is formed at the junction of the upper rear surface and the lower rear surface. The installation block further comprises a bottom surface. The bottom plate of the clip is inserted under the lower bottom surface and abutted on the lower bottom surface and the bottom surface of the installation block abuts on the bottom plate of the clip after the clip is installed in place on the oil tubing installation surface and the installation block is installed in place in the clip. The distance from the center of the oil hole to the lower bottom surface is equal to the distance from the center of the second orifice to the bottom surface of the installation block, and the distance from the center of the oil hole to the first stepped surface is greater than or equal to the distance from the center of the second orifice to the second stepped surface.

Optionally, a flange is provided on the second orifice. The flange of the second orifice is embedded tightly into the oil hole when the second orifice is aligned with and fitted to the oil hole.

Specifically, the distance between the second tongue on the left side and the second tongue on the right side is equal to the dimension of the installation block in the left-right direction, and is smaller than or equal to the dimension of the first stepped surface in the left-right direction.

According to another aspect of the present disclosure, a scroll compressor is provided. The scroll compressor comprises a shell and an oil tubing installation assembly according to the preceding aspects. The oil tubing installation assembly is adapted to be installed into the shell in a vertical direction.

Technical Effect

The long oil tubing can be more easily installed into a mid-shell of a compressor on a production line of the compressor and is not limited by the existing assembling tools by adopting the oil tubing installation assembly of the present disclosure. In this way, it is possible to efficiently manufacture a compressor, particularly a scroll compressor, which meets the functional requirements of maintaining a low oil circulation rate and drawing excess oil away from a housing.

BRIEF DESCRIPTION OF THE DRAWINGS

In order to facilitate understanding of the present disclosure, the present disclosure is hereinafter described in more detail based on exemplary embodiments and in conjunction with the accompanying drawings. The same or similar reference numbers are used in the accompanying drawings to refer to the same or similar components. It should be understood that the accompanying drawings are schematic only and that the dimensions and proportions of components in the accompanying drawings are not necessarily precise.

DETAILED DESCRIPTION

Hereinafter, the present disclosure is described in detail with reference to the accompanying drawings.

Figure 1A:
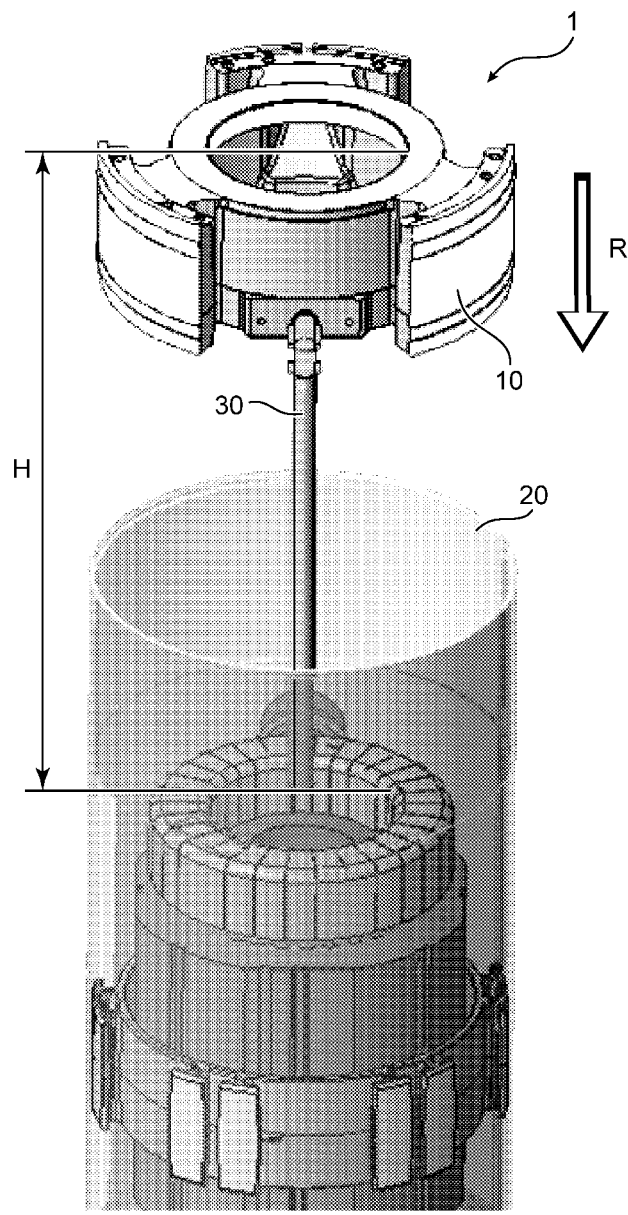
FIG. 1A is a perspective view of a state prior to assembling a housing with an oil tubing into a mid-shell of a compressor in the prior art.
Figure 1B:
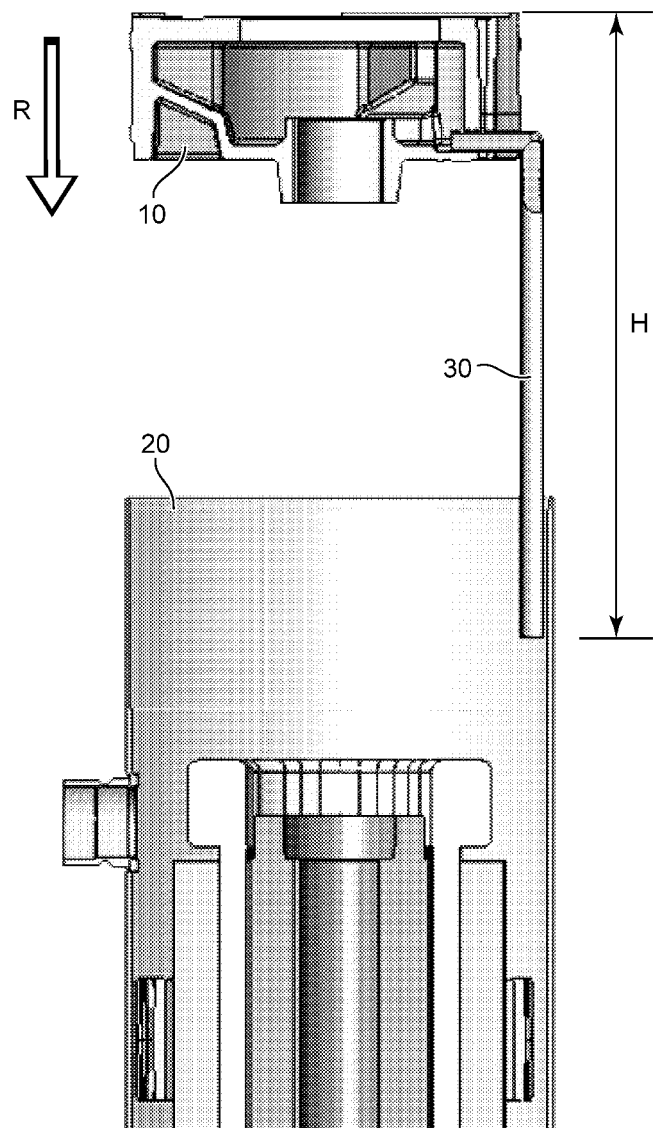
FIG. 1B is a partially cutaway side view of the state shown in FIG. 1A.
Figure 2A:
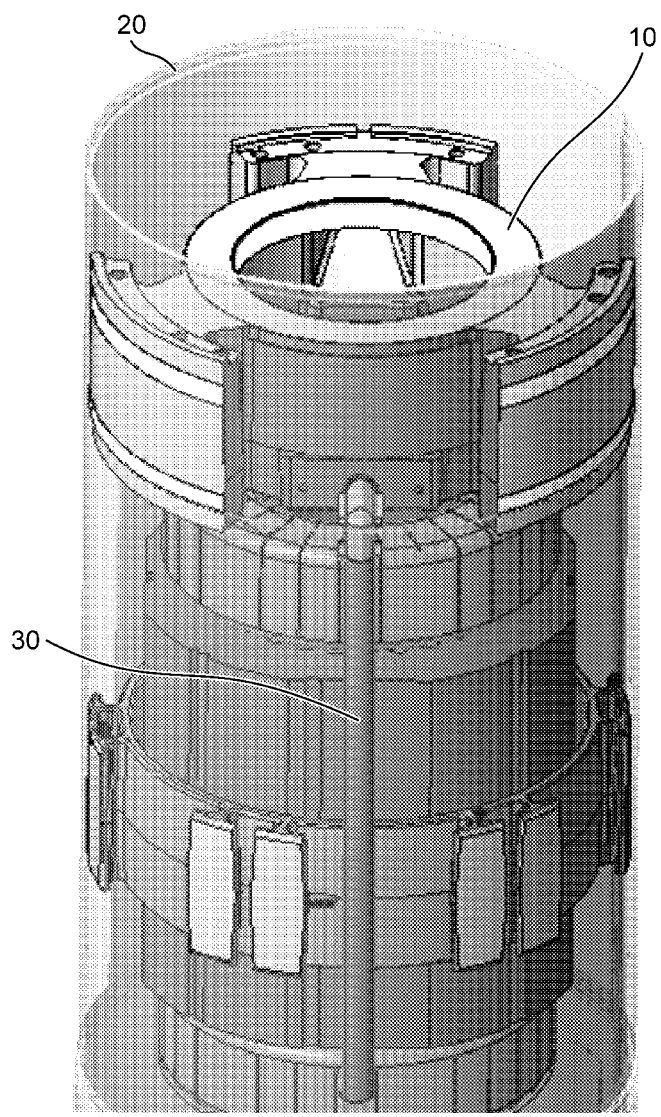
FIG. 2A is a perspective view of a state after a housing with an oil tubing is assembled into a mid-shell of a compressor in the prior art.
Figure 2B:
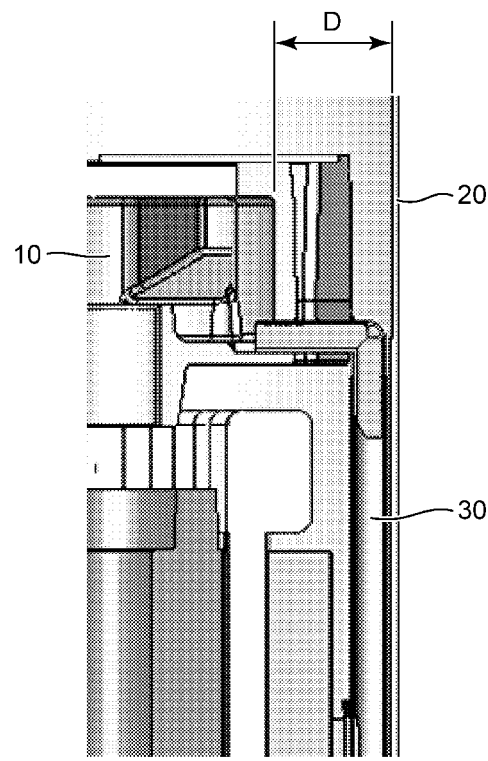
FIG. 2B is a partially cutaway side view of the state shown in FIG. 2A.
Figure 3:
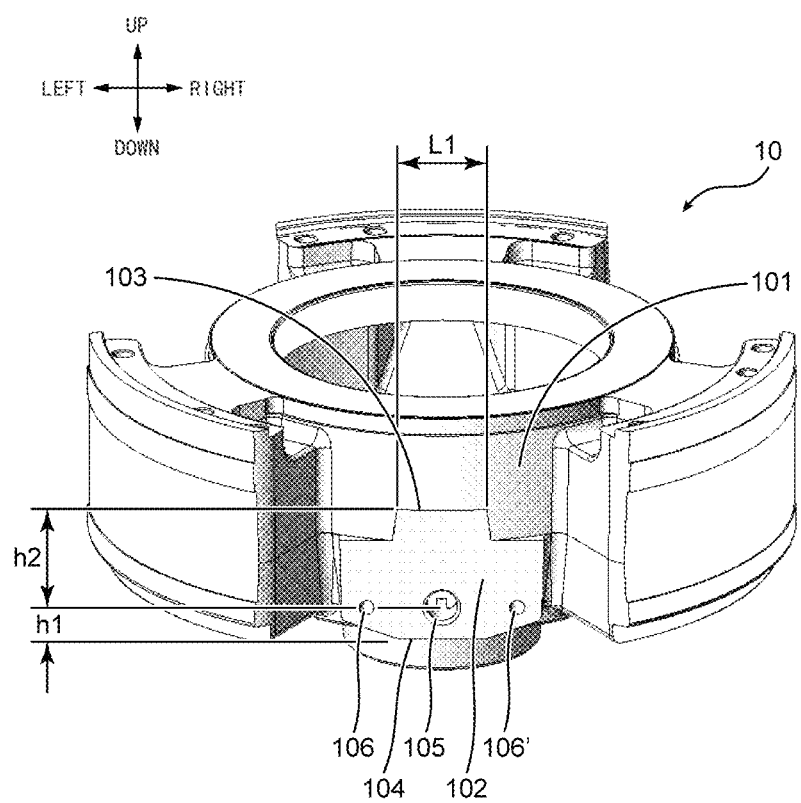
FIG. 3 is a perspective view of a housing according to an exemplary embodiment of the present disclosure.

FIG. 3 is a perspective view of a housing according to an exemplary embodiment of the present disclosure.

As shown in FIG. 3, the housing 10 has an outer peripheral surface 101. The vertical oil tubing installation surface 102 is located on the outer peripheral surface 101 and is radially inwardly offset relative to the outer peripheral surface 101, so as to form a stepped surface 103 at the junction of the outer peripheral surface 101 and the oil tubing installation surface 102. A lower bottom surface 104 is provided below the oil tubing installation surface 102. The lower bottom surface 104 is adjacent to and perpendicular to the oil tubing installation surface 102. An oil hole 105 and two threaded holes 106, 106' are opened in the oil tubing installation surface 102. The distance from the center of the oil hole 105 to the lower bottom surface 104 is h1, and the distance from the center of the oil hole to the stepped surface 103 is h2. The dimension of the stepped surface 103 in the left-right direction is L1.

Figure 4A:
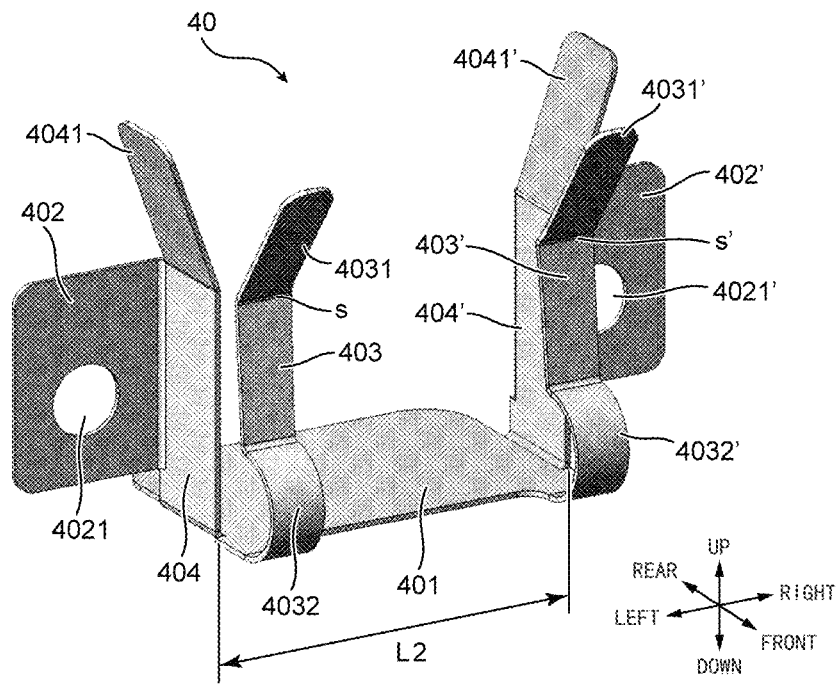
FIGS. 4A and 4B are respectively a perspective view and a side view of a clip according to an exemplary embodiment of the present disclosure.
Figure 4B:
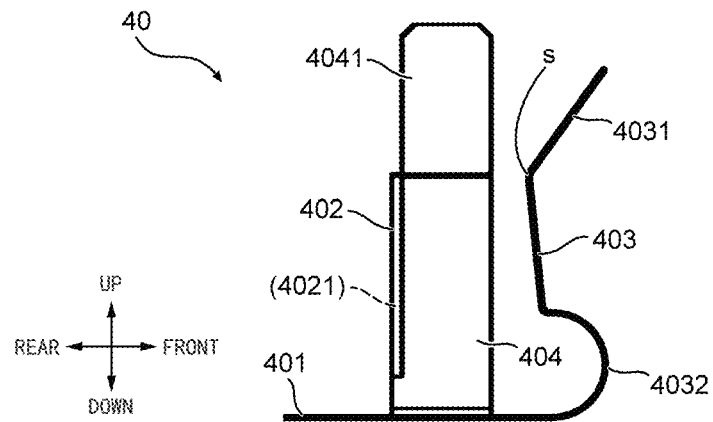

FIGS. 4A and 4B are respectively a perspective view and a side view of a clip according to an exemplary embodiment of the present disclosure. The clip 40 is adapted to be installed on the oil tubing installation surface 102 and into the mid-shell 20 along with the housing 10.

As shown in FIGS. 4A and 4B, the clip 40 is configured to have a horizontal bottom plate 401 and first elastic tongues 403, 403' extending upward from the front edge of the bottom plate 401. As will be described later, the first elastic tongues 403, 403' are configured to be in contact with the front surface 501 of the installation block 50 and apply pressure to the front surface 501 of the installation block 50, so that the rear surface 503 of the installation block 50 is abutted on the oil tubing installation surface 102 and the second orifice 507 is tightly fitted to the oil hole 105 after the installation block 50 is installed in place in the clip 40. It should be understood that, although the number of the first elastic tongues shown in FIGS. 4A and 4B is two, in practice the number of the first elastic tongues may be less or more than two.

Taking the first elastic tongue 403 as an example, the upper end 4031 of the first elastic tongue 403 is bent to the outside and can abut against the inner wall of the mid-shell 20. The lower end 4032 of the first elastic tongue 403 is arc-shaped, so that the elasticity of the first elastic tongue 403 can be increased. The upper end 4031 of the first elastic tongue 403 and the lower end 4032 of the first elastic tongue 403 are connected by a straight middle section. A turning area s is formed at the junction of the upper end 4031 of the first elastic tongue 403 and the middle section. As will be described later, the first elastic tongue 403 (specifically, the turning area s) can be embedded in the corresponding groove 5011 of the installation block 50 after the installation block 50 is installed in place in the clip 40, so as to exert pressure to the front surface 501 of the installation block 50 and have a certain limiting effect on the installation block 50. The structure of the first elastic tongue is described above by taking the first elastic tongue 403 as an example. The structure of the other first elastic tongue 403' is the same with that of the first elastic tongue 403, so its structure is not repeated here, but only a corner mark' is added to the upper right corner of the corresponding reference number in the accompanying drawings to distinguish it from the corresponding structure of the first elastic tongue piece 403.

The clip 40 is configured to have second tongues 404, 404' extending upward respectively from the left and right edges of the bottom plate. As will be described hereinafter, the second tongues 404, 404' are configured to be respectively in contact with and apply pressure to the left side 502 and the right side 502' of the installation block 50 to inhibit the movement of the installation block 50 in the left-right direction. The distance between the second tongues 404 and 404' is L2. Preferably, the upper end 4041 (4041') of the second tongue 404 (404') is bent to the outside so as to receive the installation block 50.

The clip 40 is configured to also have two third tongues 402, 402'. The third tongue 402 extends to the left side from the vertical edge of the two vertical edges of the second tongue 404 that is closer to the oil tubing installation surface 102, and the third tongue 402' extends to the right side from the vertical edge of the two vertical edges of the second tongue 404' that is closer to the oil tubing installation surface 102. Through holes 4021, 4021' are opened in the third tongues 402, 402'. It should be understood that, although the number of the through holes 4021, 4021' shown in FIGS. 4A and 4B is two, in practice the number of the through holes may be less or more than two.

The through holes 4021, 4021' in the third tongues 402, 402' are aligned with the threaded holes 106, 106' on the oil tubing installation surface 102 after the clip 40 is installed in place on the oil tubing installation surface 102 so as to fasten the clip 40 to the housing 10 with screws going through the through holes 4021, 4021' in the third tongues 402, 402' and the threaded holes 106, 106' on the oil tubing installation surface 102. The bottom plate 401 of the clip 40 is inserted under the lower bottom surface 104 of the housing 10 and abutted on the lower bottom surface 104 after the clip 40 is installed in place on the oil tubing installation surface 102.

Figure 5A:
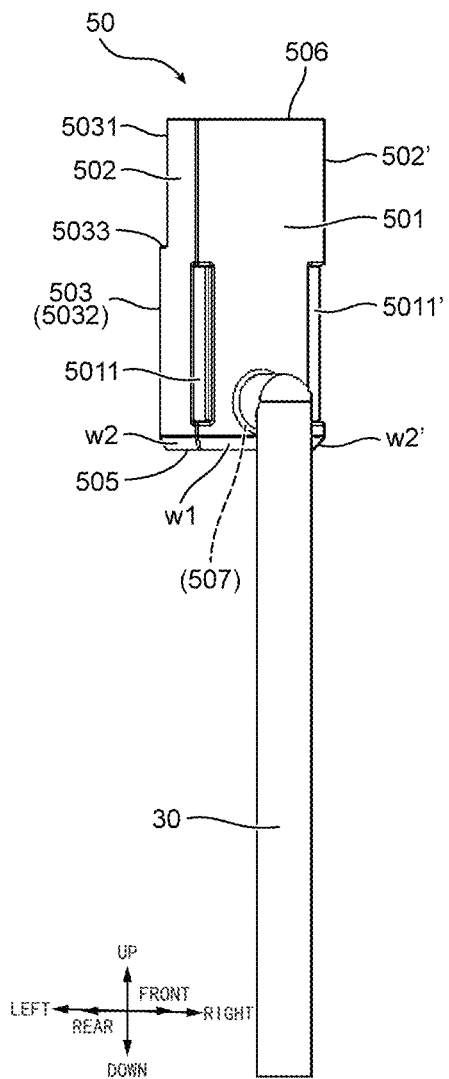
FIGS. 5A and 5B are perspective views of an oil tubing assembly according to an exemplary embodiment of the present disclosure.
Figure 5B:
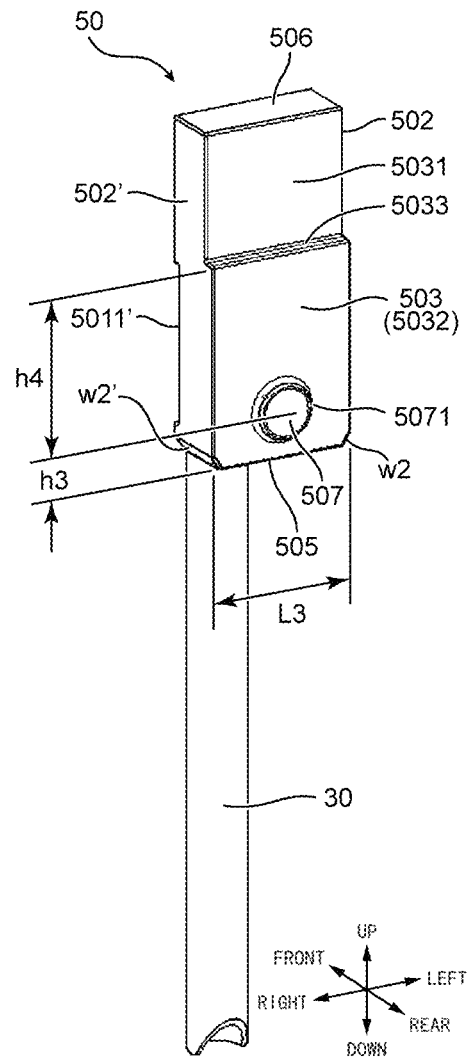

FIGS. 5A and 5B are perspective views of an oil tubing assembly according to an exemplary embodiment of the present disclosure. The oil tubing assembly is adapted to be installed into the clip 40 in a vertically downward direction R after the housing 10 and the clip 40 have been installed into the mid-shell 20.

As shown in FIGS. 5A and 5B, the oil tubing assembly comprises an oil tubing body 30 and an overall cuboid-shaped installation block 50. A through hole 507 is provided in the installation block 50. The through hole 507 is configured to have a first orifice on the front surface 501 of the installation block 50 and a second orifice on the rear surface 503 of the installation block. The upper end of the oil tubing body 30 is connected to the first orifice. The second orifice is aligned with and fitted to the oil hole 405 after the installation block 50 is installed in place in the clip 40. Preferably, a flange 5071 is provided on the second orifice. In this way, the flange 5071 can be embedded tightly into the oil hole 105 when the second orifice is aligned with and fitted to the oil hole 105.

Specifically, grooves 5011, 5011' are provided on the front surface 501 of the installation block 50. After the installation block 50 is installed in place in the clip 40, the first elastic tongue 403 (especially the turning area s) can be embedded into the groove 5011, and the first elastic tongue 403' (especially the turning area s') can be embedded into the groove 5011'. The rear surface 503 of the installation block comprises an upper rear surface 5031 and a lower rear surface 5032. The second orifice is located in the lower rear surface 5032. A stepped surface 5033 is formed at the junction of the upper rear surface 5031 and the lower rear surface 5032.

Installation block 50 also comprises a bottom surface 505 and a top surface 506. A chamfered face w1 is formed at the junction of the bottom surface 505 and the front surface 501. Chamfered faces w2 and w2' are formed respectively at the junctions of the bottom surface 505 and the left side surface 502 and the right side surface 502' of the installation block 50. In addition, the distance from the center of the second orifice to the bottom surface 505 is h3, and the distance from the center of the second orifice to the stepped surface 5033 is h4.

The bottom plate 401 of the clip 40 is abutted on the lower bottom surface 104 of the housing 10 after the clip 40 is installed in place on the oil tubing installation surface 102 and the installation block 50 is installed in place in the clip 40. Preferably, h1=h3, and h2≥h4.

The dimension of the installation block in the left-right direction is L3. Preferably, L3=L2≤L1.

Figure 6:
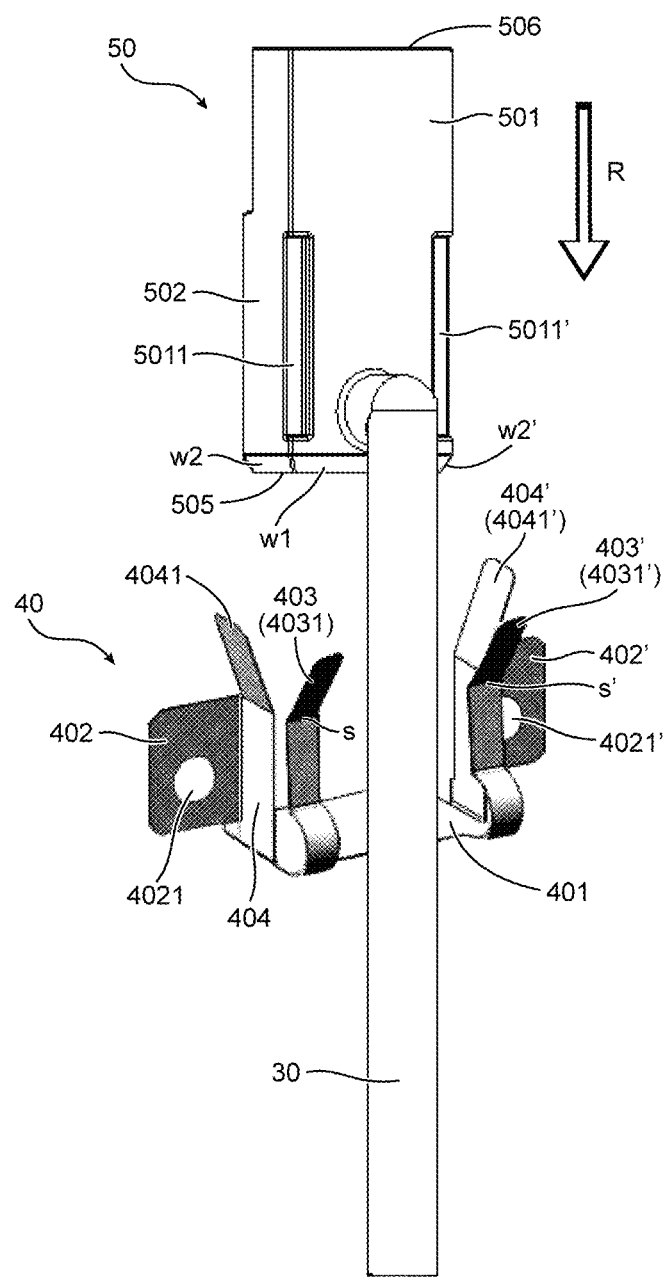
FIG. 6 is a schematic diagram of a state in the process of installing the oil tubing assembly shown in FIG. 5A to the clip shown in FIG. 4A.
Figure 7A:
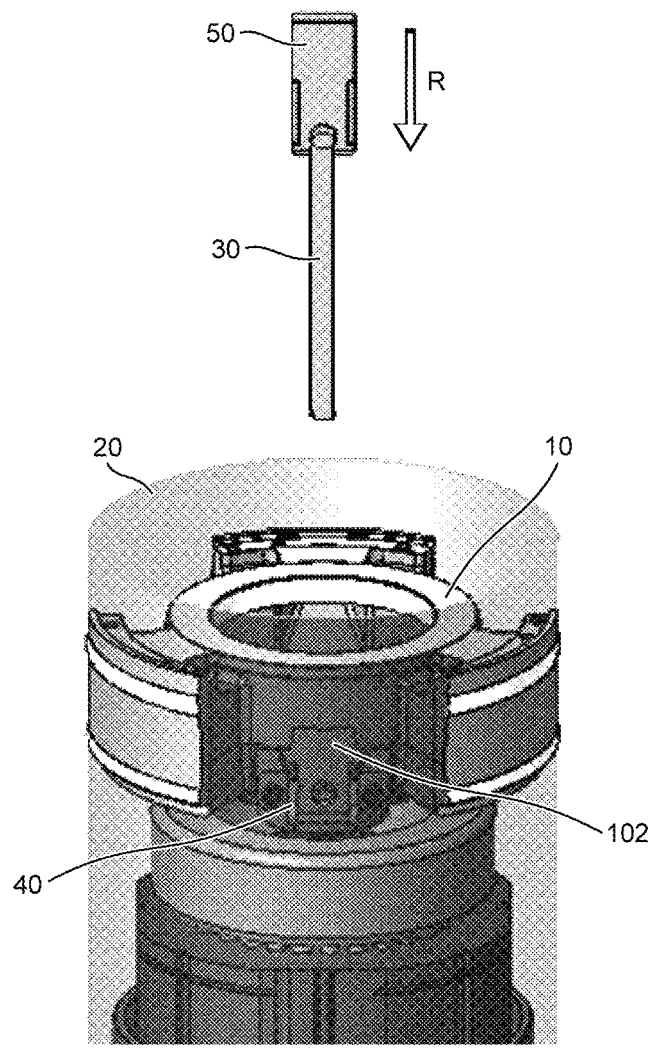
FIG. 7A is a perspective view of a state prior to assembling an oil tubing assembly into a mid-shell of a compressor according to an exemplary embodiment of the present disclosure.
Figure 7B:
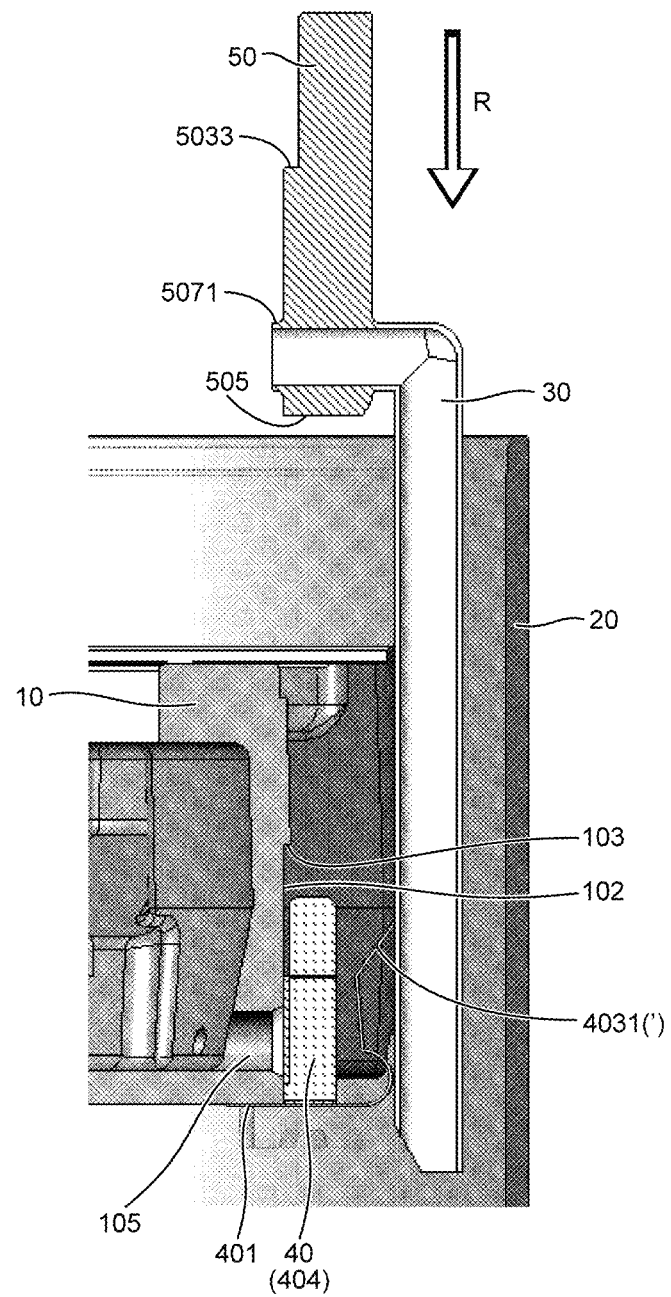
FIG. 7B is a partially cutaway side view of a state prior to assembling an oil tubing assembly into a mid-shell of a compressor according to an exemplary embodiment of the present disclosure.
Figure 8A:
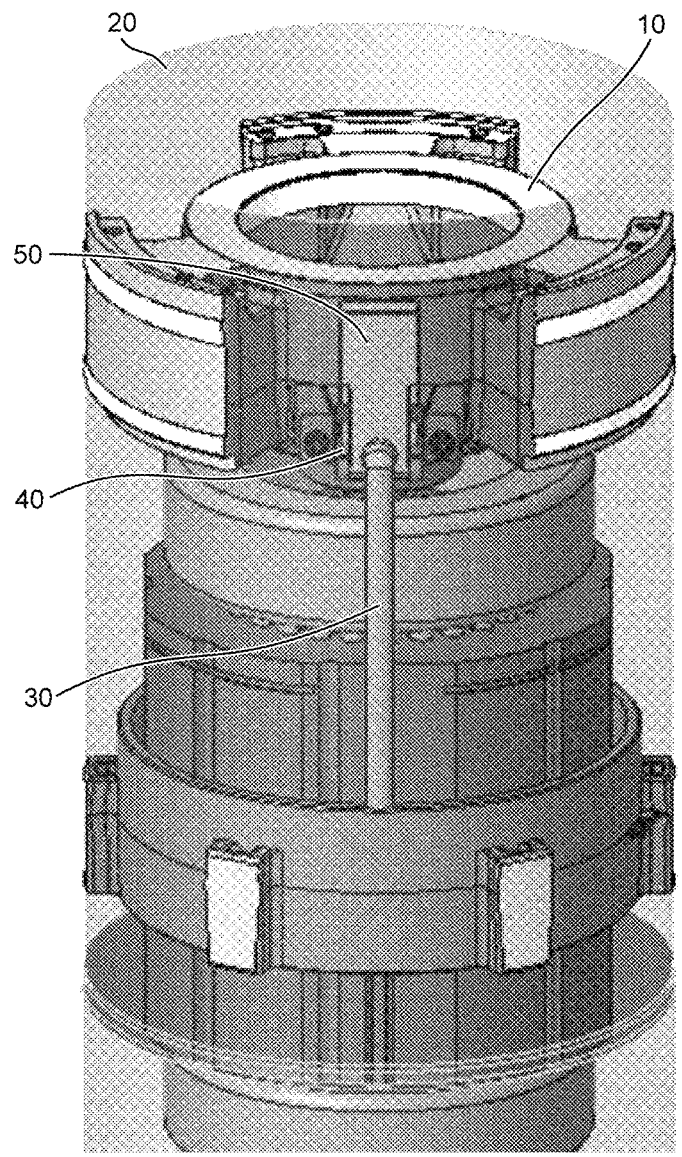
FIG. 8A is a perspective view of a state after assembling an oil tubing assembly into a mid-shell of the compressor according to an exemplary embodiment of the present disclosure.
Figure 8B:
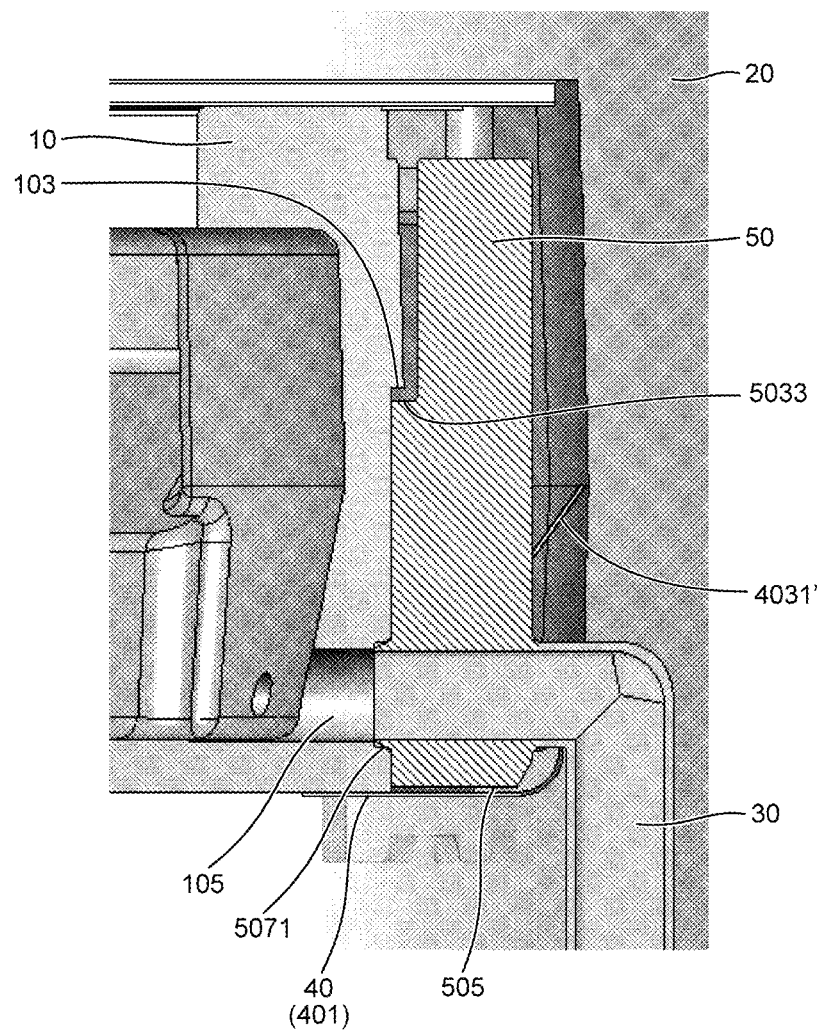
FIG. 8B is a partially cutaway side view of the state shown in FIG. 8A.

FIG. 6 is a schematic diagram of a state in the process of installing the oil tubing assembly shown in FIG. 5A to the clip shown in FIG. 4A. FIG. 7A is a perspective view of a state prior to assembling an oil tubing assembly into a mid-shell of a compressor according to an exemplary embodiment of the present disclosure. FIG. 7B is a partially cutaway side view of a state prior to assembling an oil tubing assembly into a mid-shell of a compressor according to an exemplary embodiment of the present disclosure. FIG. 8A is a perspective view of a state after assembling an oil tubing assembly into a mid-shell of the compressor according to an exemplary embodiment of the present disclosure. FIG. 8B is a partially cutaway side view of the state shown in FIG. 8A.

As shown in FIGS. 6 to 8B, the clip 40 may be pre-fixed to the housing 10 and then installed into the mid-shell 20 together with the housing 10. Then, the oil tubing assembly (i.e., the installation block 50 with the oil tubing 30) is pressed into the clip 40 in the vertically downward direction R. Specifically, as the oil tubing assembly continues to move downward in the vertically downward direction R, the chamfered face w1 comes in contact with the upper ends 4031, 4031' of the first elastic tongues 403, 403', and the chamfered faces w2, w2' comes in contact with the upper ends 4041, 4041' of the second tongues 404, 404', respectively. As the oil tubing assembly moves further downward, the first elastic tongues 403, 403' (especially the turning areas s, s') are embedded in the corresponding grooves 5011, 5011' of the installation block 50, respectively.

When the installation block 50 is installed in place in the clip 40, the second orifice is aligned with the oil hole 105, the bottom surface 505 of the installation block 50 abuts on the bottom plate 401 of the clip 40, the stepped surface 5033 quickly passes the stepped surface 103, and the installation block 50 is quickly approached to the oil tubing installation surface 102 under the pushing force of the first elastic tongues 403 and 403', so that the flange 5071 of the second orifice is embedded in the oil hole 105. At this point, the oil tubing assembly will "click" and be audible to the operator. The operator can thus know that the oil tubing assembly is already in place.

Although the technical objects, technical solutions and technical effects of the present disclosure have been described in detail above with reference to specific embodiments, it should be understood that the above-mentioned embodiments are only exemplary rather than restrictive. Within the essential spirit and principles of the present disclosure, any modifications, equivalent replacements, and improvements made by those skilled in the art are included within the protection scope of the present disclosure.

What is claimed is:

1. An oil tubing installation assembly adapted to be installed into a shell of a scroll compressor in a vertical direction, comprising:
    a housing in the shell of the scroll compressor on which a vertical oil tubing installation surface and an oil hole located in the oil tubing installation surface are provided;
    a clip adapted to be installed on the oil tubing installation surface and into the shell along with the housing; and
    an oil tubing assembly adapted to be installed into the clip in a vertical direction after the housing and the clip have been installed into the shell,
    wherein the oil tubing assembly comprises an oil tubing body and an overall cuboid-shaped installation block in which a through hole is provided, the through hole is configured to have a first orifice on a front surface of the installation block and a second orifice on a rear surface of the installation block, and an upper end of the oil tubing body is connected to the first orifice, and
    wherein the second orifice is aligned with and fitted to the oil hole of the housing after the installation block is installed in place in the clip.

2. The oil tubing installation assembly according to claim 1, wherein the clip is configured to have a horizontal bottom plate and first elastic tongues extending upward from a front edge of the horizontal bottom plate,
    wherein, the first elastic tongues are configured to be in contact with the front surface of the installation block and apply pressure to the front surface of the installation block, so that the rear surface of the installation block is abutted on the oil tubing installation surface and the second orifice is tightly fitted to the oil hole after the installation block is installed in place in the clip.

3. The oil tubing installation assembly according to claim 2, wherein upper ends of the first elastic tongues are bent towards outside and are abutted against an inner wall of the shell.

4. The oil tubing installation assembly according to claim 3, wherein grooves are provided on the front surface of the installation block;
    wherein the first elastic tongues are embeddable into the corresponding grooves after the installation block is installed in place in the clip.

5. The oil tubing installation assembly according to claim 4, wherein the clip is configured to have second tongues extending upward respectively from left and right edges of the horizontal bottom plate, and the second tongues are configured to be respectively in contact with and apply pressure to left and right sides of the installation block to inhibit the movement of the installation block in the left-right direction.

6. The oil tubing installation assembly according to claim 3, wherein the clip is configured to have second tongues extending upward respectively from left and right edges of the horizontal bottom plate, and the second tongues are configured to be respectively in contact with and apply pressure to left and right sides of the installation block to inhibit the movement of the installation block in the left-right direction.

7. The oil tubing installation assembly according to claim 2, wherein the clip is configured to have second tongues extending upward respectively from left and right edges of the horizontal bottom plate, and the second tongues are configured to be respectively in contact with and apply pressure to left and right sides of the installation block to inhibit the movement of the installation block in the left-right direction.

8. The oil tubing installation assembly according to claim 7, wherein upper ends of the second tongues are bent towards outside.

9. The oil tubing installation assembly according to claim 8, wherein threaded holes provided on the oil tubing installation surface,
    the clip is configured to also have third tongues, each of the third tongues respectively extending to the left and right sides from a vertical edge of the two vertical edges of the corresponding one of the second tongues that is closer to the oil tubing installation surface,
    through holes are provided in the third tongues,
    the through holes in the third tongues are aligned with the threaded holes on the oil tubing installation surface after the clip is installed in place on the oil tubing installation surface so as to fasten the clip to the housing with screws going through the through holes in the third tongues and the threaded holes on the oil tubing installation surface.

10. The oil tubing installation assembly according to claim 8, wherein the housing is configured to have an outer peripheral surface, the oil tubing installation surface is located on the outer peripheral surface and is radially inwardly offset relative to the outer peripheral surface, so as to form a first stepped surface at a junction of the outer peripheral surface and the oil tubing installation surface,
    a lower bottom surface is provided below the oil tubing installation surface, and the lower bottom surface is adjacent to and perpendicular to the oil tubing installation surface,
    the rear surface of the installation block comprises an upper rear surface and a lower rear surface in which the second orifice is located, and a second stepped surface is formed at a junction of the upper rear surface and the lower rear surface, the installation block further comprises a bottom surface,
    the horizontal bottom plate of the clip is inserted under the lower bottom surface and abutted on the lower bottom surface and the bottom surface of the installation block abuts against the horizontal bottom plate of the clip after the clip is installed in place on the oil tubing installation surface and the installation block is installed in place in the clip, wherein a distance from a center of the oil hole to the lower bottom surface is equal to a distance from a center of the second orifice to the bottom surface of the installation block, and a distance from the center of the oil hole to the first stepped surface is greater than or equal to a distance from the center of the second orifice to the second stepped surface.

11. The oil tubing installation assembly according to claim 10, wherein a distance between the second tongue on the left side and the second tongue on the right side is equal to a dimension of the installation block in the left-right direction, and is smaller than or equal to a dimension of the first stepped surface in the left-right direction.

12. The oil tubing installation assembly according to claim 1, wherein a flange is provided on the second orifice, and the flange of the second orifice is embedded tightly into the oil hole when the second orifice is aligned with and fitted to the oil hole.

13. A scroll compressor, comprising:
a shell; and
an oil tubing installation assembly as claimed in claim 1 adapted to be installed into the shell in a vertical direction.

* * * * *